(12) United States Patent
Shao et al.

(10) Patent No.: US 11,392,196 B2
(45) Date of Patent: Jul. 19, 2022

(54) ELECTRONIC APPARATUS, SPATIAL POSITIONING SYSTEM AND SPATIAL POSITIONING METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiyang Shao, Beijing (CN); Yuxin Bi, Beijing (CN); Chao Zheng, Beijing (CN); Jian Sun, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 314 days.

(21) Appl. No.: 16/621,398

(22) PCT Filed: Jun. 24, 2019

(86) PCT No.: PCT/CN2019/092522
§ 371 (c)(1),
(2) Date: Dec. 11, 2019

(87) PCT Pub. No.: WO2020/073684
PCT Pub. Date: Apr. 16, 2020

(65) Prior Publication Data
US 2021/0365109 A1  Nov. 25, 2021

(30) Foreign Application Priority Data
Oct. 8, 2018  (CN) .......................... 201811166195.1

(51) Int. Cl.
*G06F 3/01* (2006.01)
*G01S 5/02* (2010.01)
(Continued)

(52) U.S. Cl.
CPC ............ *G06F 3/012* (2013.01); *G01S 5/0264* (2020.05); *G01S 5/18* (2013.01); *G06T 19/006* (2013.01); *G06F 2203/012* (2013.01)

(58) Field of Classification Search
None
See application file for complete search history.

(56) References Cited

U.S. PATENT DOCUMENTS

| | | | |
|---|---|---|---|
| 10,416,305 | B2 | 9/2019 | Chen |
| 11,179,090 | B2 * | 11/2021 | Li .......................... A61B 5/374 |

(Continued)

FOREIGN PATENT DOCUMENTS

| | | |
|---|---|---|
| CN | 102893236 A | 1/2013 |
| CN | 105652279 A | 6/2016 |

(Continued)

OTHER PUBLICATIONS

International Search Report dated Sep. 24, 2019, issued in counterpart Application No. PCT/CN2019/092522 (12 pages).

(Continued)

*Primary Examiner* — Ryan M Gray
(74) *Attorney, Agent, or Firm* — WHDA, LLP

(57) ABSTRACT

An electronic apparatus is provided. The electronic apparatus may include a body (1) having an upper surface and further comprising a wearing component (11) for wearing the electronic apparatus to a user's head, and a signal receiving assembly (2) on the upper surface of the body (1). The upper surface of the body (1) may be on top of the user's head. The signal receiving assembly may be configured to (Continued)

receive a source signal from a signal emitting source and generate a first signal based on the source signal.

16 Claims, 8 Drawing Sheets

(51) Int. Cl.
  *G01S 5/18* (2006.01)
  *G06T 19/00* (2011.01)

(56) References Cited

U.S. PATENT DOCUMENTS

2018/0074600 A1* 3/2018 Park .................. G01S 13/88
2019/0214709 A1* 7/2019 Frishman ............ H01Q 21/205
2019/0304101 A1* 10/2019 Raghoebardajal ...... A63F 13/22

FOREIGN PATENT DOCUMENTS

| | | |
|---|---|---|
| CN | 107037880 A | 8/2017 |
| CN | 107193380 A | 9/2017 |
| CN | 206541019 U | 10/2017 |
| CN | 108089187 A | 5/2018 |
| CN | 207516887 U | 6/2018 |
| CN | 109407834 A | 3/2019 |
| KR | 20170119272 A | 10/2017 |

OTHER PUBLICATIONS

Office Action dated Apr. 14, 2020, issued in counterpart CN Application No. 201811166195.1, with English translation (18 pages).

* cited by examiner

ELECTRONIC APPARATUS, SPATIAL POSITIONING SYSTEM AND SPATIAL POSITIONING METHOD

CROSS-REFERENCE TO RELATED APPLICATIONS

This application claims benefit of the filing date of Chinese Patent Application No. 201811166195.1 filed on Oct. 8, 2018, the disclosure of which is hereby incorporated in its entirety by reference.

TECHNICAL FIELD

The present disclosure relates to spatial positioning technologies, and in particular, to an electronic apparatus, a computer apparatus, a spatial positioning system and a spatial positioning method.

BACKGROUND

A VR apparatus or an AR apparatus is an electronic apparatus that constructs a virtual world or works by combining virtual and real worlds. The VR apparatus generates an interactive three-dimensional environment through a processor and provides a feeling of user immersion. The AR apparatus sets the virtual world in the real world and provides interaction between the virtual world and the real word.

In both the VR apparatus and the AR apparatus, it is necessary to accurately position spatial location of the space in which the apparatus is used such as spatial location in a preset room.

BRIEF SUMMARY

An embodiment of the present disclosure provides an electronic apparatus. The electronic apparatus may include a body having an upper surface and further comprising a wearing component for wearing the electronic apparatus to a user's head and a signal receiving assembly on the upper surface of the body. The upper surface of the body may be on top of the user's head. The signal receiving assembly may be configured to receive a source signal from a signal emitting source and generate a first signal based on the source signal.

Optionally, the electronic apparatus may further include a processor, wherein the signal receiving assembly is configured to further transmit the first signal to the processor, and the processor is configured to generate information regarding spatial position and/or motion of the electronic apparatus based on the first signal.

Optionally, the signal receiving assembly comprises a plurality of signal receiving units spaced apart on the upper surface of the body.

Optionally, each of the signal receiving units comprises a plurality of signal receiving sensors, and there is a first distance between every two adjacent signal receiving sensors, and at least four of the plurality of signal receiving sensors are not in a same plane at a same time.

Optionally, the upper surface of the body comprises a top central region and a peripheral region surrounding the top central region; the peripheral region comprising a plurality of sub-peripheral regions symmetrically arranged with respect to the top central region; and the top central region comprises at least one of the signal receiving units, each of the plurality of sub-peripheral regions comprise more signal receiving units than the top central region, and two of the signal receiving units in the plurality of sub-peripheral regions are arranged in mirror images of each other.

Optionally, the upper surface of the body is an upwardly convex curved surface, and the top central region covers a highest point of the upwardly convex curved surface; and the peripheral region comprises two sub-peripheral regions, which are oppositely disposed on both sides of the top central region.

Optionally, a distance in a vertical direction between any two of the plurality of signal receiving sensors is at least about 8 mm, a distance in a traverse direction between any two of the plurality of signal receiving sensors is at least about 8 mm, and a distance in a longitudinal direction between any two of the plurality of signal receiving sensors is at least about 8 mm.

Optionally, each of the signal receiving units further comprises a plurality of mounting planes provided with the plurality of signal receiving sensors respectively, the plurality of mounting planes are connected to one another, and an angle between two adjacent mounting planes is greater than or equal to 120 degrees.

Optionally, the top central region comprises less or equal number of mounting planes than the peripheral region, a front part of the peripheral region comprises more number of mounting planes than a rear part of the peripheral region.

Optionally, each of the plurality of mounting planes comprises a groove and an enclosure connected to inner walls of the groove, and wherein a signal receiving sensor is disposed at a bottom of the groove, and the enclosure is above the signal receiving sensor.

Optionally, the signal receiving sensor is at a center of the bottom of the groove, and a center line of a bottom of the groove passes through a center point of the enclosure.

Optionally, the enclosure is made of a transparent polarizing material.

Optionally, an angle between a line connecting a groove edge and the center point of the enclosure and the center line of the bottom of the groove is greater than a signal receiving angle of the signal receiving sensor.

Optionally, the electronic apparatus further comprises a peripheral component, which is detachably coupled to the upper surface of the body, and the signal receiving assembly is on the peripheral component.

Optionally, the electronic apparatus further includes an inertial measurement unit, wherein the inertial measurement unit is configured to emit a second signal to the processor, the processor being configured to generate the information regarding spatial position and/or motion of the electronic apparatus based on the first signal and the second signal.

One embodiment of the present disclosure is a spatial positioning system, comprising the electronic apparatus according to one embodiment of the present disclosure; and one signal emitting source configured to emit the source signal, the signal emitting source being positioned higher than the upper surface of the body of the electronic apparatus.

Optionally, the source signal emitted by the signal emitting source is one of an optical signal, an electrical signal, an electromagnetic signal, or an acoustic signal.

One embodiment of the present disclosure is a spatial positioning method, which comprises receiving a source signal from a signal emitting source, generating a first signal based on the source signal, and transmitting the first signal to a processor by a signal receiving assembly of an electronic apparatus, and generating information regarding spatial position and/or motion of the electronic apparatus based on the first signal by the processor.

Optionally, the processor is configured to further receive a second signal from an inertial measurement unit, and generate information regarding the spatial position and/or motion of the electronic apparatus based on the first signal and the second signal.

Optionally, generating the information regarding spatial position and/or motion of the electronic apparatus based on the first signal by the processor comprises forming a database including correspondence relationship between a processing result of the first signal and information regarding spatial position and motion of the electronic apparatus; processing the first signal to obtain the processing result of the first signal by the processor, and determining the information regarding spatial position and motion of the electronic apparatus based on the processing result of the first signal and the correspondence relationship in the database.

DETAILED DESCRIPTION

Figure 1:
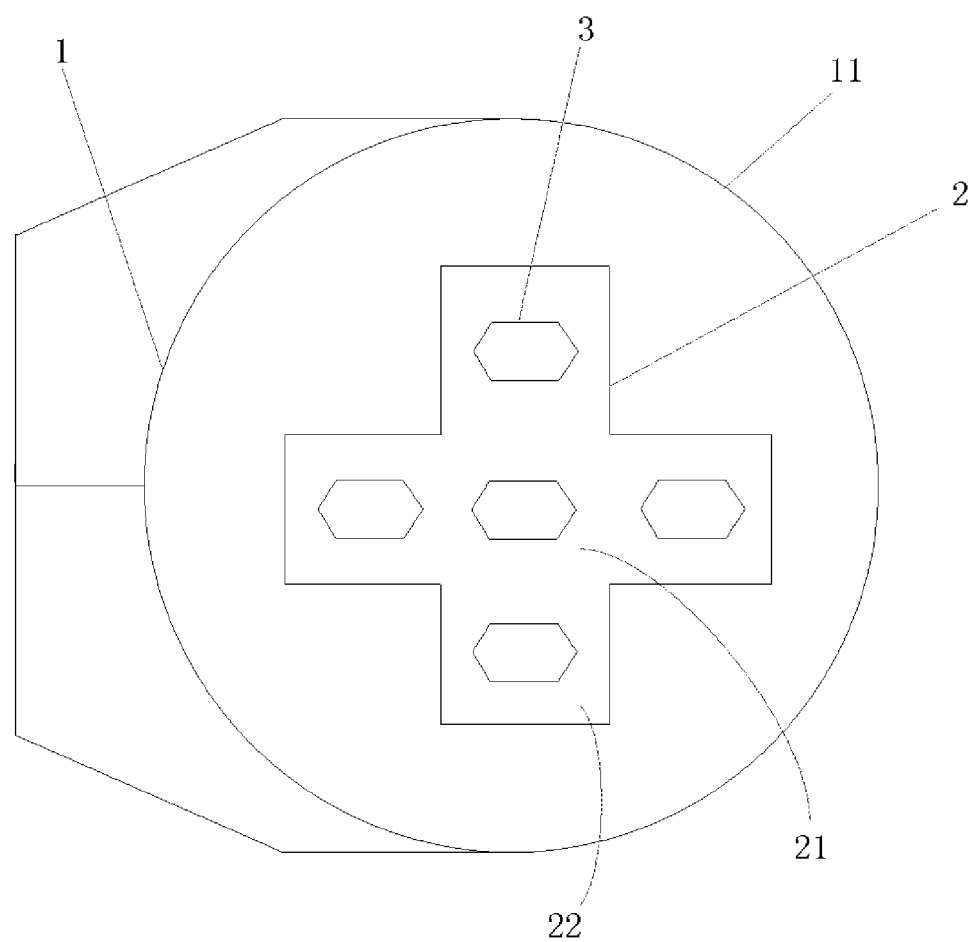
FIG. 1 is a schematic structural diagram of a top view of an electronic apparatus according to one embodiment of the present disclosure.

In order to make the objects, technical solutions, and advantages of the embodiments of the present disclosure more apparent, the technical solutions according to the embodiments of the present disclosure will be described below clearly and fully with reference to the drawings, but the embodiments described below are only particular embodiments, which are not intended to represent all embodiments of the present disclosure. Based upon the embodiments in the present disclosure, other embodiments which will be apparent to those skilled in the art are within the scope of the present disclosure.

When an element and an embodiment of the present disclosure are introduced, the articles "a", "an", "the" and "said" are intended to indicate that one or more elements are present. The terms "comprising", "including", "containing" and "having" are intended to be inclusive and mean that there may be additional elements other than the listed elements.

For the purpose of surface description hereinafter, as direction-calibrated in the accompanying drawings, the terms "above", "below", "left", "right", "vertical", "horizontal", "top", "bottom" and derivatives thereof shall relate to the present disclosure. The terms "covered with", "on top of", "positioned on", or "positioned on top of" mean that, for example, a first element of a first structure is on a second element of a second structure, wherein an intermediate element such as an intermediate structure may exist between the first element and the second element. The term "contact" means that, for example, the first element of the first structure and the second element of the second structure are connected directly or indirectly, and other elements may exist or not exist at the interface between the two elements.

Unless otherwise defined, all the terms (including the technical and scientific terms) used herein have the same meanings as commonly understood by one of ordinary skill in the art to which the present disclosure is directed. It is also understood that the terms such as defined in the usual dictionary should be interpreted as having the same meanings as the meaning in the context of the relevant technology. The terms should not be interpreted as an idealization or as having extreme meanings, unless they are explicitly defined herein. As employed herein, the statement that two or more parts are "connected" or "coupled" together shall mean that the parts are joined together either directly or joined through one or more intermediate parts.

In the description of the present disclosure, the terms "center," "horizontal," "vertical," "length," "width," "thickness," "upper," "lower," "front," "back," "left," "right," "top," "bottom," "inner," "outer," or the like are based on the orientation or positional relationship shown in the drawings. They are used merely for convenience of description and simplifying description of the present invention, but not to indicate or imply that the indicated apparatus or element must have a specific orientation, or be constructed and operated in a specific orientation, therefore cannot be construed as a limitation of the present disclosure.

In addition, the terms "first" and "second" or the like are for illustration purposes only and are not to be construed as indicating or implying relative importance or implied reference to the quantity of indicated technical features. Thus, features defined by the terms "first" and "second" may explicitly or implicitly include one or more of the features. In the description of the present disclosure, the meaning of "plural" is two or more unless otherwise specifically and specifically defined.

Figure 2:
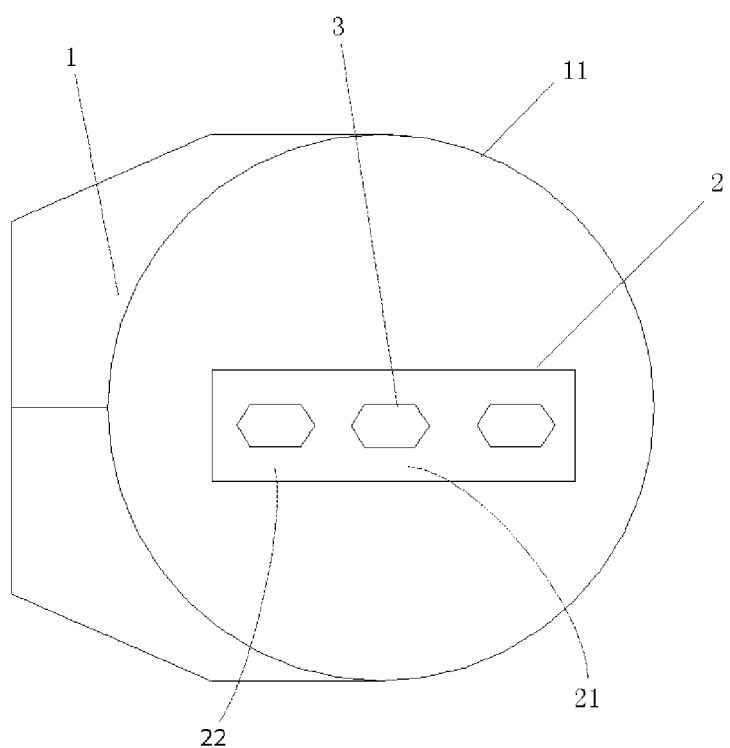
FIG. 2 is a schematic structural diagram of a top view of an electronic apparatus according to one embodiment of the present disclosure.

FIG. 1 is a schematic structural diagram of a top view of an electronic apparatus according to one embodiment of the present disclosure. FIG. 2 is a schematic structural diagram of a top view of another electronic apparatus according to one embodiment of the present disclosure. As shown in FIG. 1 and FIG. 2, the electronic apparatus according to one embodiment of the present disclosure includes a body 1 and a signal receiving assembly 2. The body 1 includes an upper surface and is provided with a wearing component 11 capable of being worn on a wearing part of the user. The signal receiving assembly 2 is disposed on an upper surface of the body 1 for receiving a source signal emitted by a signal emitting source, generating a first signal based on the received source signal, and transmitting the first signal to a processor. The processor can generate information regarding spatial location and/or motion of the electronic apparatus based on the first signal.

Optionally, the electronic apparatus in the embodiment of the present disclosure is an apparatus capable of combining virtual world and display, such as an AR apparatus or a VR apparatus. Since a display structure needs to be worn in front of the user's eyes when the apparatus is in use, the body 1 of the electronic apparatus, that is, the main body portion of the electronic apparatus is provided with the wearing component 11 so that the body 1 can be worn on the wearing part of the user. That is, the display structure of the main body can be worn in front of the user's eyes. The wearing component 11 may be a structure that can be worn over the user's head, such as a helmet, a headband, etc. The wearing component 11 may also be a structure capable of looping around the user's head where the user's eyes are located, or a wearing structure similar to legs of a glass. The upper surface of the body 1 is a portion worn on the top of the user's head, and may be provided with a functional component or a free space. The front portion of the body 1 is mainly used to dispose the display structure. Therefore, the signal receiving assembly 2 is preferably disposed on the upper surface of the body 1 such that when the user wears the electronic apparatus provided by the embodiment of the present disclosure, the body 1 is worn on the wearing part of the user, and the signal receiving assembly 2 is located at the top of the user's head. At this time, the signal receiving assembly 2 can receive signals located in front of, behind and above the electronic apparatus, in particular, signals from above a preset plane in a present space, thereby forming an excellent signal emitting and receiving structure. The signal receiving assembly 2 is a device capable of receiving a source signal emitted from a signal emitting source in real time, and needs to correspond with the type of the signal emitted by the signal emitting source. For example, when the source signal emitted by the signal emitting source is an optical signal, the signal receiving assembly 2 needs to be a receiving device capable of receiving an optical signal. After receiving the source signal, the signal receiving assembly 2 can perform conventional pre-processing such as conversion, filtering, enhancement, etc., and generates a first signal, and then transmit the first signal to the processor. The processor may be a processor provided by the electronic apparatus such as MCU, FPGA and other main chips, or may be a processor provided on an external electronic terminal such as an external computer as a processor. The manner in which the signal receiving assembly 2 transmits the first signal may be a wireless transmission or a wired transmission. For example, after the signal receiving assembly 2 receives the source signal and processes it into the first signal, the first signal (which can be a sensor time stamp) can be transmitted via a connection cable with a USB connector or wirelessly.

In some embodiments of the present disclosure, the signal receiving assembly is disposed on the upper surface of the electronic apparatus, and is capable of receiving a signal from the front, the rear, or the upper side of the electronic apparatus. Compared with the prior art wherein the signal receiving assembly is disposed at a front portion of the electronic apparatus, the position of the signal receiving assembly in some embodiments of the present disclosure is such that the signal receiving angle is much wider and cannot be blocked by an object at the same level as the electronic apparatus. As such, the signal receiving is more stable. In addition, compared with the front portion of the electronic apparatus, the top portion of the electronic apparatus has more idle space and thus has more position for setting the signal receiving assembly, thereby facilitating the setting of the signal receiving assembly. Furthermore, it is more convenient to satisfy the requirement that any four sensors in the signal receiving assembly are not in the same plane at the same time, which can effectively reduce the number of distribution points in the signal receiving assembly, that is, reduce the number of sensors, thereby saving the production cost.

In one embodiment, as shown in FIG. 1 and FIG. 2, the signal receiving assembly 2 includes a plurality of signal receiving units 3. The plurality of the signal receiving units 3 are spaced apart on the upper surface of the body 1.

In the embodiment, the signal receiving assembly 2 is composed of a plurality of signal receiving units 3, which are distributed in different regions of the upper surface of the body 1 of the electronic apparatus, thereby ensuring large receiving area for the source signal and increased accuracy of the received signal. In addition, the plurality of signal receiving units 3 may be separated from one another. As such, it can be avoided that the plurality of signal receiving units 3 constitute an integral signal receiving assembly 2, which can result in an excessive volume of the signal receiving assembly 2, thereby further facilitating the signal receiving assembly 2 being disposed on the upper surface of the body 1 of the electronic apparatus. But the present application does not limit the structural form of the signal receiving assembly 2, which may also be an integral structure.

In one embodiment, as shown in FIG. 1 and FIG. 2, the upper surface of the body 1 includes a top central region 21 and a peripheral region 22 surrounding the top central region 21. The upper surface is an upwardly convex curved surface. The top central region 21 covers the highest point of the curved surface. The top central region 21 is provided with at least one of the signal receiving units 3, and the peripheral region 22 is provided with a plurality of signal receiving units 3 distributed at intervals.

In one embodiment, the peripheral region includes two sub-peripheral regions, which are oppositely disposed on both sides of the top central region.

In one embodiment, the electronic apparatus provided by the present disclosure is an electronic apparatus capable of realizing a combination of virtual word and reality. When worn, the upper surface of the body 1 of the electronic apparatus is located on the top of the user's head. The upper surface of the body 1 may be a structure in which the center of the upper surface is higher than the surrounding positions, for example, an upwardly convex curved surface. Therefore, when the signal receiving units 3 are disposed at the upper surface of the body 1, the entire upper surface of the body 1 can be divided into the top central region 21 and the peripheral region 22. The top central region 21 covers the highest point of the curved surface. Then, a number of signal receiving units 3 is disposed corresponding to the area of each region. In one embodiment, the top central region 21 may be provided with a signal receiving unit 3 at the highest point of the curved surface, or a plurality of signal receiving units 3 may be arranged at intervals in the top central region 21. The peripheral region 22 can be provided with a plurality of signal receiving units 3 according to specific conditions, and the signal receiving units 3 are preferably spaced apart from one another at certain intervals.

In one embodiment, as shown in FIG. 1 and FIG. 2, a plurality of the signal receiving units 3 are disposed in the peripheral region 22, with every two of the signal receiving units being opposite each other. For example, when the electronic apparatus is worn on the user's head, the top center region 21 is located in the center region of the user's head and the peripheral region 22 is located around the center of the user's head. The peripheral region 22 may be symmetrical with reference to the top central region 21, so that every two of the signal receiving units 3 may be disposed opposite each other in the peripheral region 22. At this time, the opposite two signal receiving units 3 are distributed at both sides of the center of the top central region 21 symmetrically. In one embodiment, the number of the peripheral regions 22 may be two, and oppositely disposed on both sides of the top central region 21. The top central region 21 and the peripheral regions 22 may integrally form an arcuate face, or an approximately arcuate face, which can then be placed on the top of the user's head.

Figure 3:
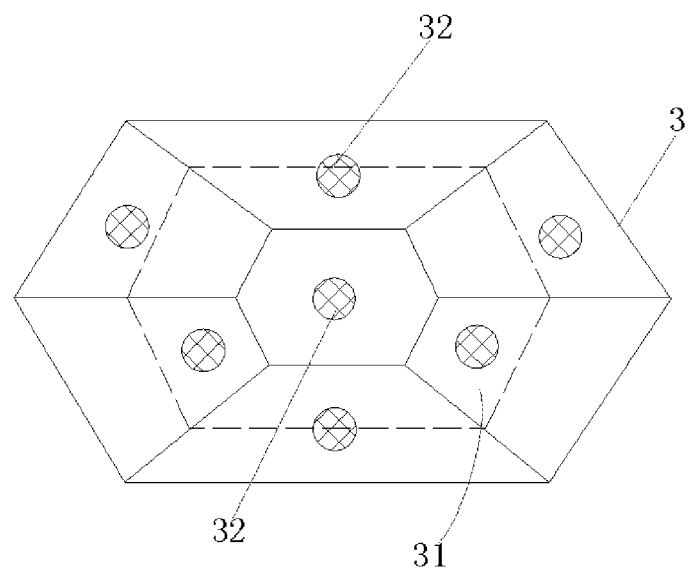
FIG. 3 is a schematic structural diagram of a signal receiving unit according to one embodiment of the present disclosure.

In one embodiment, as shown in FIG. 1 to FIG. 3, in order to enable the signal receiving unit 3 to receive a source signal from a signal emitting source at a wide angle, for example, receiving source signals from a stereo 360° range, the signal receiving unit 3 is composed of a plurality of signal receiving sensors 32. In one embodiment, a preset first distance is formed between every two adjacent signal receiving sensors 32. The preset first distance can be determined according to specific situation and is not specifically limited in the present disclosure. In one embodiment, the number of signal receiving sensors 32 in the signal receiving unit 3 is greater than four, and any at least four of the signal receiving sensors 32 are not in the same plane at the same time. As such, the manner in which the signal receiving sensors 32 are arranged enables the electronic apparatus to accurately receive the source signal regardless of the state of the electronic apparatus with reference to the signal emitting source. That is, regardless of whether the top of the electronic apparatus is tilted, horizontal, vertical, or totally in motion relative to the signal emitting source, the electronic apparatus can still be ensured to accurately receive the source signal from the signal emitting source. Then, a first signal is sent based on the received source signal to a processor, and the processor can calculate accurately spatial position and motion state of the electronic apparatus using the first signal.

In one embodiment, a distance in a vertical direction between any two of the plurality of signal receiving sensors is at least about 8 mm, a distance in a traverse direction between any two of the plurality of signal receiving sensors is at least about 8 mm, and a distance in a longitudinal direction between any two of the plurality of signal receiving sensors is at least about 8 mm.

In one embodiment, as shown in FIG. 1, the upper surface of the body comprises a top central region 21 and a peripheral region 22 surrounding the top central region. The peripheral region 22 includes a plurality of sub-peripheral regions symmetrically arranged with respect to the top central region 21. The top central region 21 includes at least one of the signal receiving units 3, each of the plurality of sub-peripheral regions includes more signal receiving units than the top central region, and two of the signal receiving units in the plurality of sub-peripheral regions are arranged in mirror images of each other.

Figure 4:
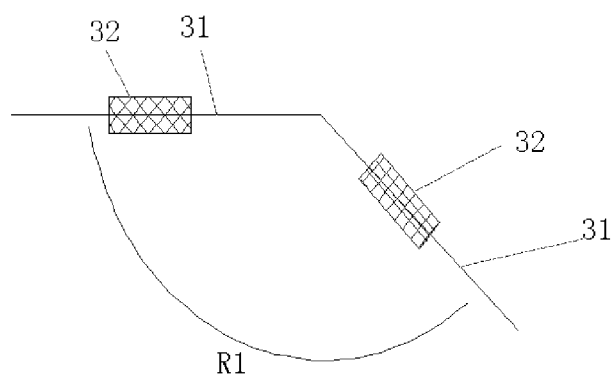
FIG. 4 is a schematic structural diagram showing an angle between any two adjacent mounting planes of a signal receiving unit according to one embodiment of the present disclosure.

In one embodiment, as shown in FIG. 3 and FIG. 4, the signal receiving unit 3 includes a plurality of mounting planes 31 provided with signal receiving sensors 32 respectively. The plurality of mounting planes 31 are connected to one another to form a signal receiving unit 3 of a three-dimensional shape. In one embodiment, an angle R1 between two adjacent mounting planes 31 is greater than or equal to 120 degrees.

In one embodiment, the signal receiving unit 3 is an integral structure including a carrier and a plurality of signal receiving sensors 32 disposed on the carrier. As such, a plurality of structures for mounting signal receiving sensors 32 are required to be disposed on the signal receiving unit 3. That is, a plurality of mounting structures is disposed on the carrier. In one embodiment, the structures for mounting the signal receiving sensors 32 are mounting planes 31. In addition, in order to make the signal receiving sensors 32 after being disposed on the mounting planes 31 of the signal receiving unit 3 to satisfy that a preset first distance is present between every two adjacent signal receiving sensors 32 and any at least four signal receiving sensors 32 are not in the same plane at the same time, the plurality of mounting planes 31 are connected to one another to form the three-dimensional shape of the signal receiving unit 3. Furthermore, the angle between two adjacent mounting planes 31 is greater than or equal to 120 degrees. For example, the angle between two adjacent mounting planes 31 may be 130 degrees, 150 degrees, but preferably not equal to 180 degrees.

Figure 5:
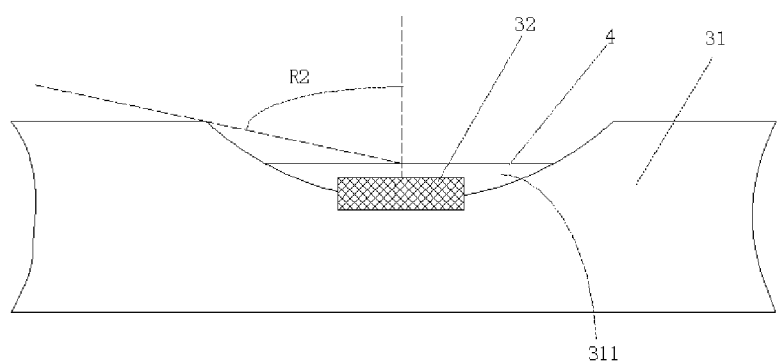
FIG. 5 is a schematic structural diagram of a mounting plane of a signal receiving unit mounted with a signal receiving sensor according to one embodiment of the present disclosure.

In one embodiment, as shown in FIG. 5, a groove 311 is disposed on the mounting plane 31, and the signal receiving sensor 32 is disposed at a bottom of the groove 311. An enclosure 4 connected to the inner walls of the groove 311 is disposed above the signal receiving sensor 32.

In one embodiment, the enclosure is configured to protect the signal receiving sensor 32 from dust and moisture, thereby extending the life of the sensor and ensuring accurate reception of the source signal. In addition, when the source signal is an optical signal, the enclosure is preferably made of a transparent polarizing material. That is, the enclosure can play the role of protection. At the same time, the enclosure can filter out the light of interfering source signal through the polarization of the enclosure, thereby further ensuring the accuracy of the received source signal.

In one embodiment, as shown in FIG. 5, the signal receiving sensor 32 is disposed at a center position of a bottom of the groove 311. A center line of a bottom of the groove 311 passes through a center point of the enclosure. The center line of a bottom of the groove 311 is a line passing through the center point of the bottom of the groove and perpendicular to the bottom of the groove. The angle R2 between a line connecting the edge of the groove 311 and the center point of the enclosure 4 and the center line of the bottom of the groove 311 is larger than the signal receiving angle of the signal receiving sensor 32.

Figure 6A:
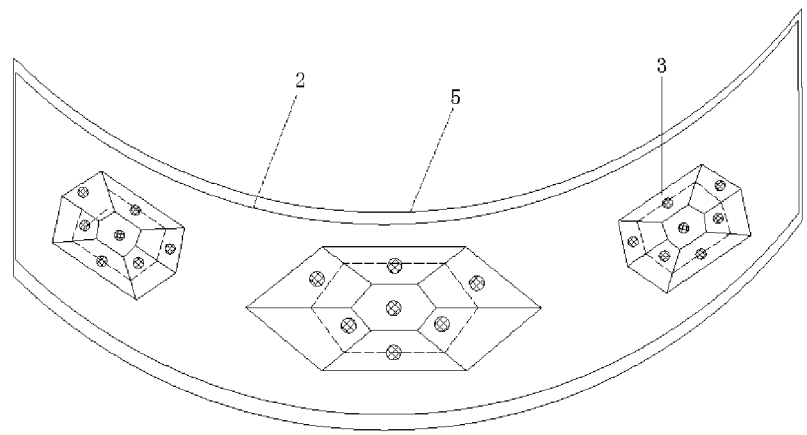
FIG. 6A is a schematic structural diagram of a peripheral component according to one embodiment of the present disclosure.

In one embodiment, as shown in FIG. 6A, the electronic apparatus provided by the embodiment of the present disclosure further includes a peripheral component 5. The peripheral component 5 is adapted to the upper surface of the body 1, and is detachably connected to the upper surface of the body 1. The signal receiving assembly 2 is disposed on the peripheral component 5. For example, the peripheral component 5 may be a component for fixing the body 1 of the electronic apparatus to the user's head, or may be a structure detachably connected to the upper surface of the electronic apparatus. The connection between the peripheral component 5 and the body 1 of the electronic apparatus may be a bolt connection, a magnetic connection, an adhesive connection, or the like. By adding the peripheral component 5, the signal receiving assembly 2 can be detachably connected to the body 1 of the electronic apparatus, which is convenient for maintenance and does not affect the setting of other functional components on the electronic apparatus.

Figure 6B:
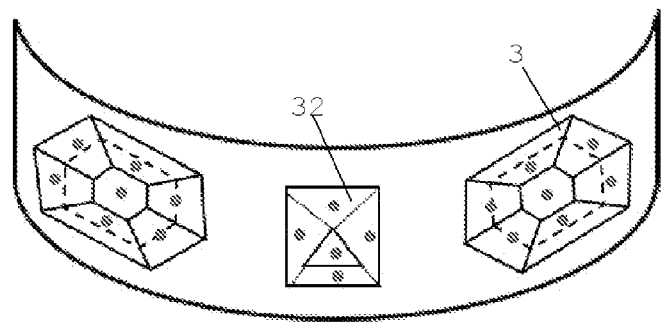
FIG. 6B is a schematic structural diagram of an electronic apparatus according to one embodiment of the present disclosure.

In one embodiment, as shown in FIG. 6B, the top central region comprises less or equal number of mounting planes than the peripheral region. In one embodiment, a front part of the peripheral region comprises more number of mounting planes than a rear part of the peripheral region.

In one embodiment, the electronic apparatus provided by the embodiment of the present disclosure further includes an inertial measurement unit, where the inertial measurement unit is configured to emit a second signal to the processor. The processor is configured to obtain information regarding spatial position and/or motion of the electronic apparatus based on the first signal and the second signal.

In one embodiment, the inertial measurement unit is a component for measuring three-axis attitude angle (or angular rate) and acceleration of the object. The general inertial measurement unit may include three single-axis accelerometers and three single-axis gyros. The accelerometers detect the acceleration information of the object in the three coordinate axes of the carrier coordinate system. The gyros measure the angular velocity and acceleration of the object in the three-dimensional space, and calculate the posture of the object based on the measurement thereof. Therefore, the second signal sent by the inertial measurement unit includes the above information, and the processor can generate more precise information regarding spatial position and motion of the electronic apparatus by simultaneously processing the first signal and the second signal. In addition, through the obtained information regarding spatial position and motion, it is possible to determine which motion state the user is in and a specific location of the user in the preset space.

Figure 7:
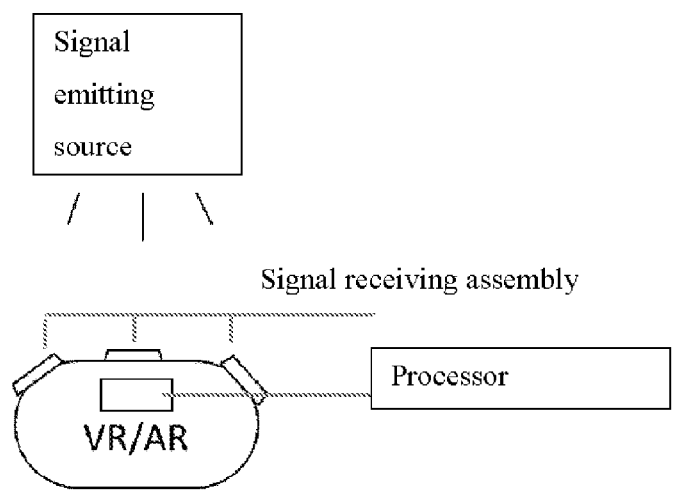
FIG. 7 is a schematic structural diagram of a spatial positioning system according to one embodiment of the present disclosure.

One embodiment of the present disclosure is a spatial positioning system, as shown in FIG. 7 which includes an electronic apparatus according to one embodiment of the present disclosure and the signal emitting source. The electronic apparatus as shown in FIG. 1 and FIG. 2 includes a body 1 and a signal receiving assembly 2. The body 1 includes an upper surface, and is provided with a wearing component 11 that can be worn at a wearing portion of the user. The signal receiving assembly 2 is disposed on the upper surface of the body 1 for receiving a source signal emitted by a signal emitting source. The signal emitting source is disposed above a preset plane wherein the electronic apparatus is located in a preset space, and the signal emitting source emits a source signal to a lower portion of the preset space. The electronic apparatus may further include a processor, wherein the signal receiving assembly of the electronic apparatus receives the source signal, generates a first signal based on the received source signal, and transmits the first signal to the processor. The processor generates information regarding spatial location and/or motion of the electronic apparatus based on the first signal.

In one embodiment, as shown in FIG. 7, the spatial positioning system includes only one signal emitting source configured to emit the source signal. The signal emitting source is positioned higher than the upper surface of the body of the electronic apparatus.

In one embodiment, the electronic apparatus can directly be the electronic apparatus provided according to previous embodiments of the present disclosure. For the specific implementation, it can be referred to the related content described previously, and details thereof are not described herein again. The signal emitting source may also be referred to as a base station, and may be fixedly disposed at a certain position in a preset space. The signal emitting source may be an apparatus for emitting a signal, that is, a source signal, in real time when the electronic apparatus is in operation. The preset space may be a space inside a house, an empty square or other space capable of setting a signal emitting source and using an electronic apparatus having a combination of virtual world and display. In the embodiment of the present disclosure, the optimal position of the signal emitting source is at an upper portion of the preset space, for example, at a ceiling of the indoor space or a space above a square, as long as it is located above a preset plane where the electronic apparatus is located, that is, higher than the upper surface of the electronic apparatus in operation. In this way, the signal emitted by the signal emitting source radiates from a high place to a low place, and can form a good signal emitting and receiving relationship with the signal receiving assembly of the electronic apparatus located at the lower portion of the preset space.

In a specific implementation, the signal emitting source is disposed above or right above the preset plane where the electronic apparatus is located.

In one embodiment, the disposing position of the signal emitting source needs to be higher than the position where the electronic apparatus operates, and the coverage region of the signal emitted by the signal emitting source includes entire activity region of the electronic apparatus. Therefore, it is preferable to dispose the signal emitting source above or right above where the electronic apparatus is located, for example, at a center of the ceiling of the room, or at other positions of the ceiling, or at a position at an upper portion of the room with respect to the ground. In addition, the manner of disposing the signal emitting source may not be specifically limited. The signal emitting source may be fixedly mounted by an auxiliary component such as a screw, a strap, or an adhesive.

In one embodiment, the type of the signal emitted by the signal emitting source may not be specifically limited. The source signal may be one of an optical signal, an electrical signal, an electromagnetic signal, or an acoustic signal. It should be noted here that the signal receiving assembly needs to match the signal type sent by the signal emitting source to ensure that the corresponding type of signal can be received. In addition, when the signal receiving assembly receives any of the above types of source signals, the source signal is preferably converted into an electrical signal, that is, the first signal, by conversion, which is then transmitted to the processor. This facilitates the processor to perform fast processing, thereby quickly generating such information regarding spatial location of the electronic apparatus and motion trajectory of the electronic apparatus.

Figure 8:
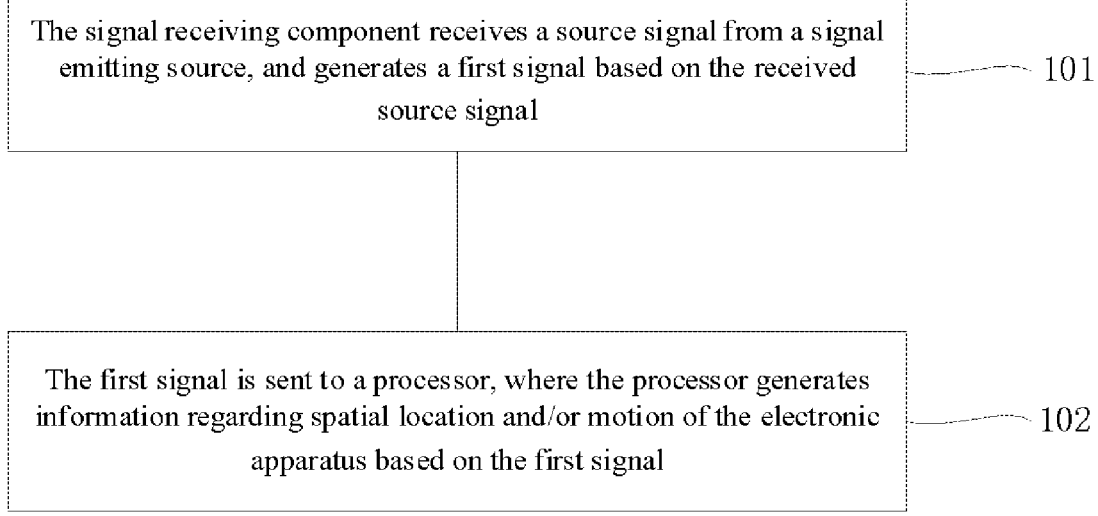
FIG. 8 is a flowchart of a spatial positioning method according to one embodiment of the present disclosure.

One embodiment of the present disclosure is a spatial positioning method. As shown in FIG. 8, the spatial positioning method according to one embodiment of the present disclosure includes the following steps 101 and 102.

In step 101, the signal receiving assembly receives a source signal from a signal emitting source, and generates a first signal based on the received source signal.

In step 102, the first signal is sent to a processor, where the processor generates information regarding spatial location and/or motion of the electronic apparatus based on the first signal.

Specifically, the method provided by the embodiment of the present disclosure can be directly implemented by using the spatial positioning system provided in the previous embodiment of the present disclosure, wherein the signal receiving assembly, the signal emitting source, the source signal, and the processor are all described in the previous embodiment, and will not be repeated here.

In the technical solution of the present disclosure, the spatial positioning method implemented by the spatial positioning system provided in one embodiment of the present disclosure is used, and the signal emitting source is disposed above a preset plane in a preset space in the process of implementation. At the same time, the signal receiving assembly is disposed on the upper surface of the electronic apparatus. At this time, the two form a signal receiving mode similar to the air-to-ground, which can avoid occlusion of objects located at the same level as the electronic apparatus at the bottom portion of the preset space. As such, the signal reception is more stable; In addition, the upper surface of the electronic apparatus has more idle space than the front of the electronic apparatus, and accordingly has more space for setting the signal receiving assembly. As such, it is convenient to set the signal receiving assembly, and it is also convenient to realize that any four sensors in the signal receiving assembly are not in the same plane at the same time. Such a method can effectively reduce the number of points in the signal receiving assembly, that is, reduce the number of sensors, thereby saving the production cost.

In one embodiment, the processor receives a first signal from a signal receiving assembly and a second signal from an inertial measurement unit, and generates information regarding spatial location and/or motion of the electronic apparatus based on the first signal and the second signal.

Specifically, the processor can obtain spatial position information and motion information of the electronic apparatus by processing the first signal, and then perform auxiliary processing by using the second signal obtained by the inertial measurement unit, thereby obtaining more accurate spatial location information and motion information for electronic apparatuses.

In one embodiment, a database includes correspondence relationship between a processing result of the first signal and information regarding spatial position and motion state of the electronic apparatus. The processor processes the first signal to obtain the processing result, and determines spatial location information and/or motion information of the electronic apparatus according to the processing result and the correspondence relationship in the database.

In one embodiment, the database includes positional information such as an angle or a distance between each of the signal receiving sensors in the signal receiving assembly and the signal emitting source. This positional information corresponds to spatial positioning value such as translation and rotation values of the electronic apparatus of a known geometry. An established correspondence table that includes various location information and various motion information of the electronic apparatus in the preset space are pre-stored in the database. When the processor processes the first signal, the data information matching the first signal from the database can be obtained, so that the spatial position information and the motion information of the electronic apparatus can be quickly determined, thereby effectively reducing the amount of calculation and speeding up the processing.

One embodiment of the present disclosure is a computer apparatus, comprising: a memory and one or more processors, the memory being coupled to the processor. The processor is configured to perform the program stored in the memory, thereby executing the spatial positioning method described above.

In one embodiment, the receipt of the source signal, the generation of the first signal, and the specific program for processing the first signal are stored in the memory as program units, and the above described program units stored in the memory are executed by the processor to implement the corresponding functions.

In one embodiment, the processor contains a core, and the core obtains the corresponding program units from the memory. The core can be set to one or more.

The above memory may include non-persistent memory, random access memory (RAM) and/or non-volatile memory in computer readable media, for example, a read only memory (ROM) or a flash RAM. The memory includes at least one memory chip.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. An electronic apparatus, comprising:
   a body having an upper surface and further comprising a wearing component for wearing the electronic apparatus to a user's head, and the upper surface of the body is on top of the user's head; and
   a signal receiving assembly on the upper surface of the body;
   wherein the signal receiving assembly is configured to receive a source signal from a signal emitting source and generate a first signal based on the source signal;
   the electronic apparatus further includes a processor, the signal receiving assembly is configured to further transmit the first signal to the processor, and the processor is configured to generate information regarding spatial position and/or motion of the electronic apparatus based on the first signal;
   the signal receiving assembly comprises a plurality of signal receiving units spaced apart on the upper surface of the body;
   each of the signal receiving units comprises a plurality of signal receiving sensors, and there is a first distance between every two adjacent signal receiving sensors, and at least four of the plurality of signal receiving sensors are not in a same plane at a same time; and
   the upper surface of the body comprises a top central region and a peripheral region surrounding the top central region; the peripheral region comprising a plurality of sub-peripheral regions symmetrically arranged with respect to the top central region; and
   the top central region comprises at least one of the signal receiving units, each of the plurality of sub-peripheral regions comprise more signal receiving units than the top central region, and two of the signal receiving units in the plurality of sub-peripheral regions are arranged in mirror images of each other.

2. The electronic apparatus according to claim 1, wherein the upper surface of the body is an upwardly convex curved surface, and the top central region covers a highest point of the upwardly convex curved surface; and
   the peripheral region comprises two sub-peripheral regions, which are oppositely disposed on both sides of the top central region.

3. An electronic apparatus, comprising:
   a body having an upper surface and further comprising a wearing component for wearing the electronic apparatus to a user's head, and the upper surface of the body is on top of the user's head; and a signal receiving assembly on the upper surface of the body;

wherein the signal receiving assembly is configured to receive a source signal from a signal emitting source and generate a first signal based on the source signal;

the electronic apparatus further includes a processor, the signal receiving assembly is configured to further transmit the first signal to the processor, and the processor is configured to generate information regarding spatial position and/or motion of the electronic apparatus based on the first signal;

the signal receiving assembly comprises a plurality of signal receiving units spaced apart on the upper surface of the body;

each of the signal receiving units comprises a plurality of signal receiving sensors, and there is a first distance between every two adjacent signal receiving sensors, and at least four of the plurality of signal receiving sensors are not in a same plane at a same time; and a distance in a vertical direction between any two of the plurality of signal receiving sensors is at least about 8 mm, a distance in a traverse direction between any two of the plurality of signal receiving sensors is at least about 8 mm, and a distance in a longitudinal direction between any two of the plurality of signal receiving sensors is at least about 8 mm.

4. The electronic apparatus according to claim 3, wherein each of the signal receiving units further comprises a plurality of mounting planes provided with the plurality of signal receiving sensors respectively, the plurality of mounting planes are connected to one another, and an angle between two adjacent mounting planes is greater than or equal to 120 degrees.

5. The electronic apparatus according to claim 4, wherein the top central region comprises less or equal number of mounting planes than the peripheral region, a front part of the peripheral region comprises more number of mounting planes than a rear part of the peripheral region.

6. The electronic apparatus according to claim 5, wherein each of the plurality of mounting planes comprises a groove and an enclosure connected to inner walls of the groove, and
wherein a signal receiving sensor is disposed at a bottom of the groove, and the enclosure is above the signal receiving sensor.

7. The electronic apparatus according to claim 6, wherein the signal receiving sensor is at a center of the bottom of the groove, and a center line of a bottom of the groove passes through a center point of the enclosure.

8. The electronic apparatus according to claim 6, wherein the enclosure is made of a transparent polarizing material.

9. The electronic apparatus according to claim 7, wherein an angle between a line connecting a groove edge and the center point of the enclosure and the center line of the bottom of the groove is greater than a signal receiving angle of the signal receiving sensor.

10. The electronic apparatus according to claim 1, further comprising:
a peripheral component, which is detachably coupled to the upper surface of the body;
wherein the signal receiving assembly is on the peripheral component.

11. The electronic apparatus according claim 1, further comprising an inertial measurement unit,
wherein the inertial measurement unit is configured to emit a second signal to the processor, the processor being configured to generate the information regarding spatial position and/or motion of the electronic apparatus based on the first signal and the second signal.

12. A spatial positioning system, comprising:
the electronic apparatus according to claim 1; and
one signal emitting source configured to emit the source signal, the signal emitting source being positioned higher than the upper surface of the body of the electronic apparatus.

13. The spatial positioning system according to claim 12, wherein the source signal emitted by the signal emitting source is one of an optical signal, an electrical signal, an electromagnetic signal, or an acoustic signal.

14. A spatial positioning method, comprising:
receiving a source signal from a signal emitting source, generating a first signal based on the source signal, and transmitting the first signal to a processor by a signal receiving assembly of an electronic apparatus, and
generating information regarding spatial position and/or motion of the electronic apparatus based on the first signal by the processor;
wherein the electronic apparatus includes a body having an upper surface, a wearing component for wearing the electronic apparatus to a user's head, a signal receiving assembly on the upper surface of the body, and a processor;
the upper surface of the body is on top of the user's head, and the signal receiving assembly comprises a plurality of signal receiving units spaced apart on the upper surface of the body;
each of the signal receiving units comprises a plurality of signal receiving sensors, and there is a first distance between every two adjacent signal receiving sensors, and at least four of the plurality of signal receiving sensors are not in a same plane at a same time; and
the upper surface of the body comprises a top central region and a peripheral region surrounding the top central region; the peripheral region comprising a plurality of sub-peripheral regions symmetrically arranged with respect to the top central region; and
the top central region comprises at least one of the signal receiving units, each of the plurality of sub-peripheral regions comprise more signal receiving units than the top central region, and two of the signal receiving units in the plurality of sub-peripheral regions are arranged in mirror images of each other.

15. The spatial positioning method according to claim 14, wherein the processor is configured to further receive a second signal from an inertial measurement unit, and generate information regarding the spatial position and/or motion of the electronic apparatus based on the first signal and the second signal.

16. The spatial positioning method according to claim 14, wherein generating the information regarding spatial position and/or motion of the electronic apparatus based on the first signal by the processor comprises:
forming a database including correspondence relationship between a processing result of the first signal and information regarding spatial position and motion of the electronic apparatus;
processing the first signal to obtain the processing result of the first signal by the processor, and
determining the information regarding spatial position and motion of the electronic apparatus based on the processing result of the first signal and the correspondence relationship in the database.

* * * * *